Oct. 6, 1970　　　SVEN-ERIK NORE ERIKSSON　　　3,532,241
SHOVEL LOADER WITH SIDE TIPPING SHOVEL

Filed April 16, 1968　　　　　　　　　　　　　3 Sheets-Sheet 1

INVENTOR.
Sven-Erik Nore Eriksson.
BY
Attorney

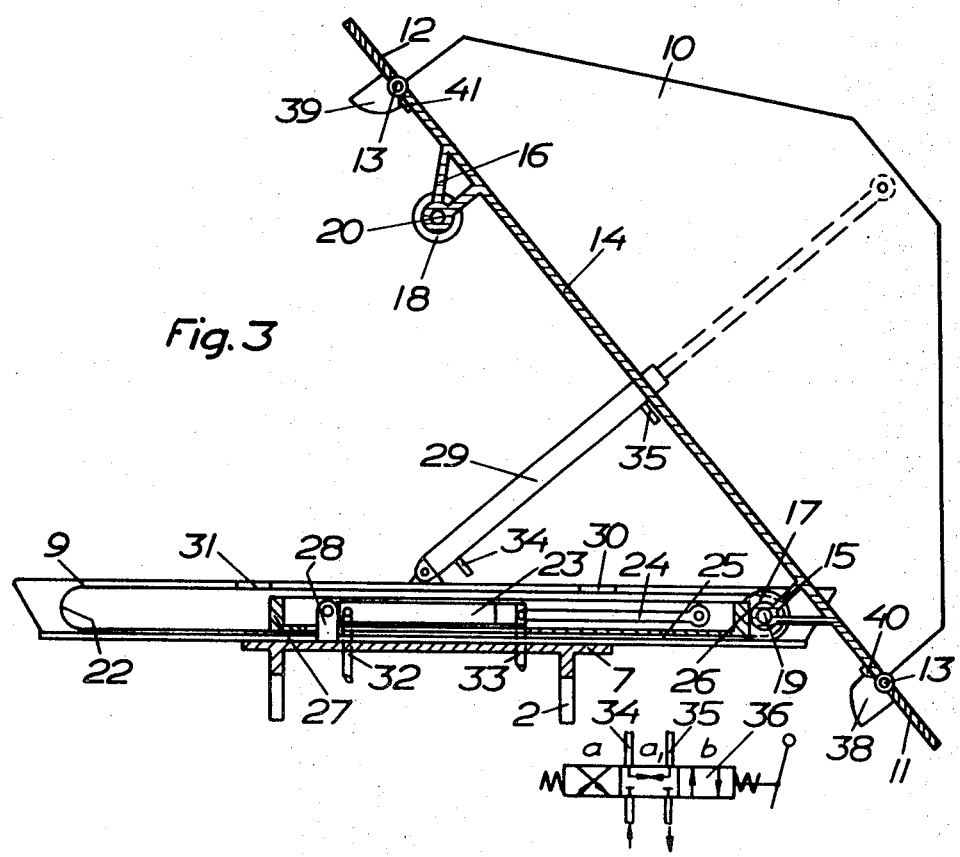
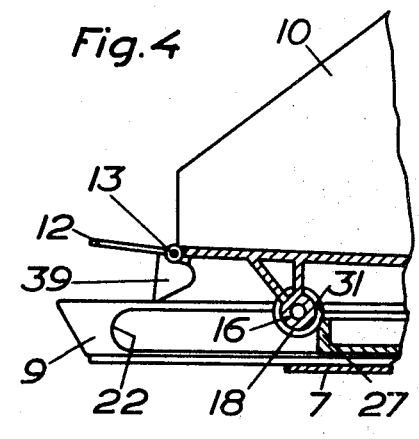
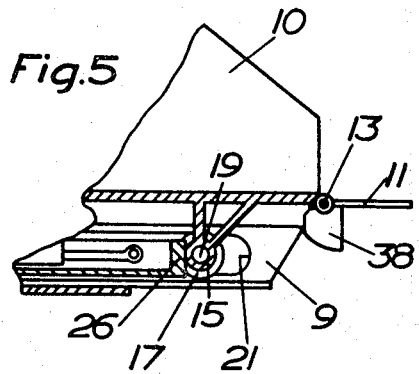

United States Patent Office 3,532,241
Patented Oct. 6, 1970

3,532,241
SHOVEL LOADER WITH SIDE TIPPING SHOVEL
Sven-Erik Nore Eriksson, Adolfsberg, Sweden, assignor to Atlas Copco Aktiebolag, Nacka, Sweden, a corporation of Sweden
Filed Apr. 16, 1968, Ser. No. 721,655
Claims priority, application Sweden, Apr. 21, 1967, 5,615/67
Int. Cl. E02f 3/28
U.S. Cl. 214—768
6 Claims

ABSTRACT OF THE DISCLOSURE

A side tipping shovel formed as a transverse U-shaped trough with side walls at the ends of the trough tiltable upon side displacement of the shovel to a position substantially flush with bottom of the shovel.

---

This invention relates to shovel loaders having a side tipping shovel formed as a transverse trough, which is carried by a support and is locked against side tipping relative to said support in digging position but which is movable towards the side of the loader and is thereby unlocked for tipping and discharging towards said side. Side tipping shovels for shovel loaders are well known in a great variety of embodiments and the present invention is particularly related to the above indicated type of side tipping shovels which are movable sideways towards the dumping side of the loader in connection with or during the tipping or dumping movement. Such a devcie is described in our U.S.A. Pat. 3,313,437. One object of the present invention is to provide a shovel loader of the type above described which has a large shovel capacity and operates with a minimum of spill during the dumping operation. For this purpose the shovel loader according to the invention is provided with a side tipping shovel which is formed as a trough extending in the transverse direction of the loader and the invention is substantially characterized by this that the ends of the trough are closed by side walls and that the side wall situated at the dumping side is tiltable and arranged to be unlocked for tilting by side movement of the shovel towards the dumping side so that said wall upon a following tipping of the shovel is tilted to a position which permits a substantially unrestricted outflow of material from the shovel towards the dumping side.

In the accompanying drawings one embodiment of a shovel loader according to the invention is illustrated by way of example together with a shovel intended for said loader.

Figure 1:
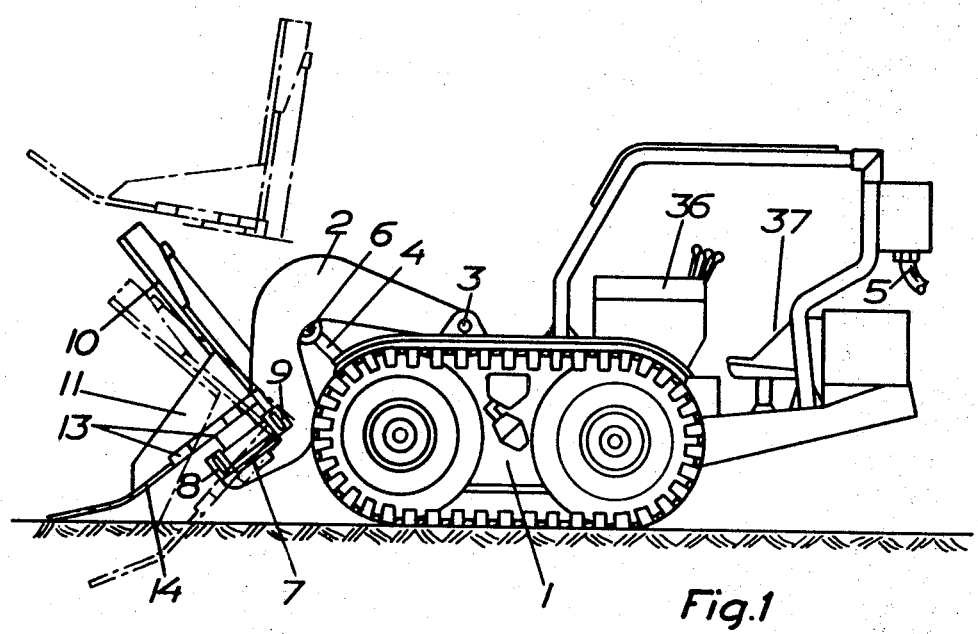
Figure 2:
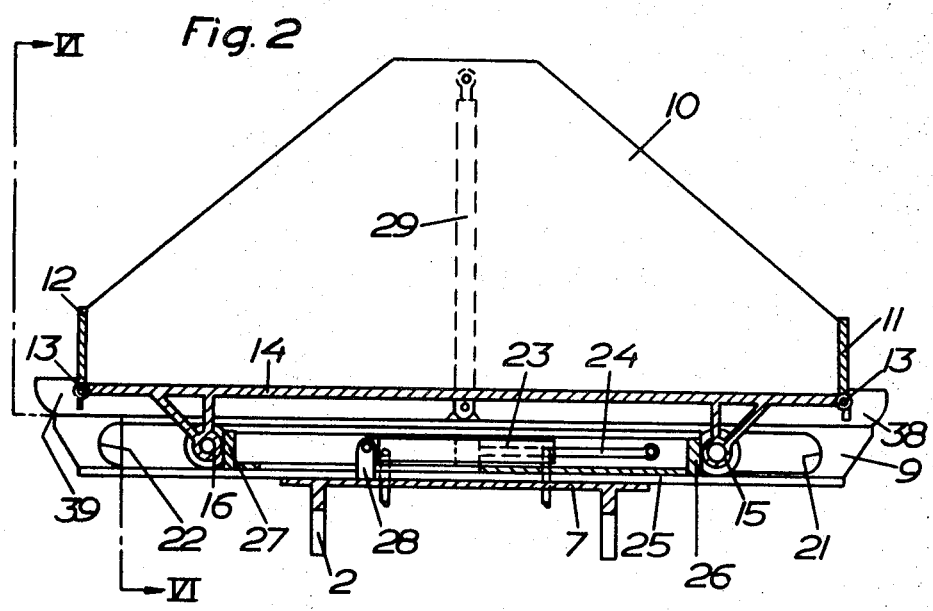
Figure 6:
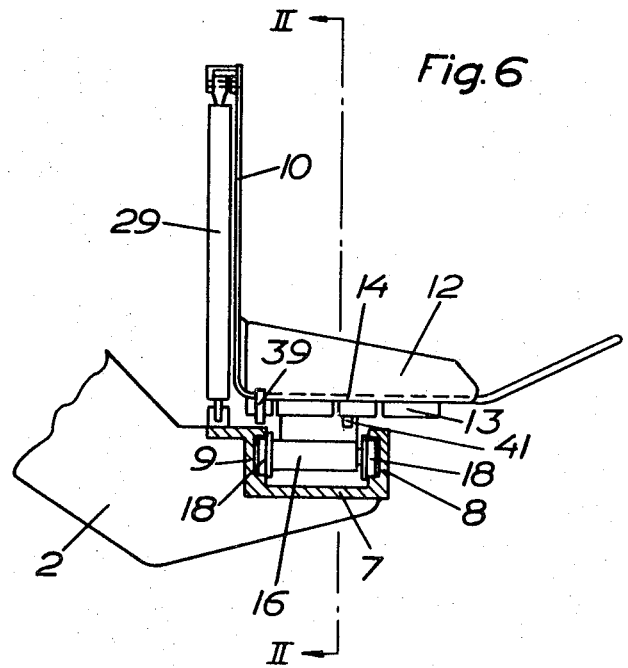
Figure 7:
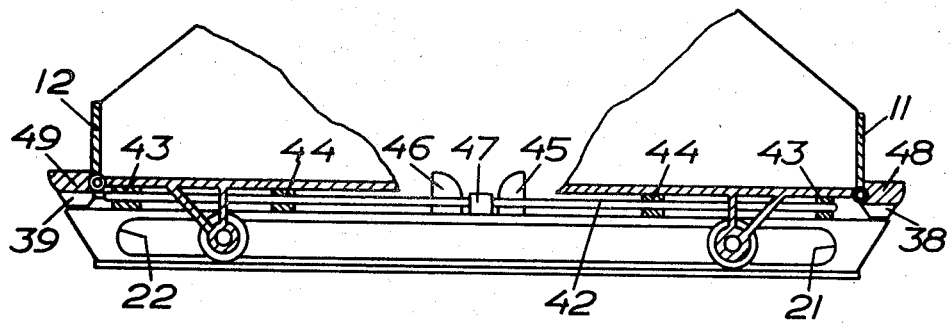

FIG. 1 is a side view of the loader with the shovel illustrated in full lines in digging position and in chain dotted lines in an extreme low position and in raised position. FIG. 2 is a transverse section and front elevation of the shovel of said loader in raised position and on a larger scale. FIG. 3 is a similar transverse section and front elevation of the shovel in side dumping position. FIGS. 4 and 5 are transverse sections of the end portions of the shovel in laterally displaced position. FIG. 6 is a side view of the shovel and partial section on a plane in the longitudinal direction of the loader through a part of the support for the shovel. FIG. 7 illustrates a locking bar for the side walls of the shovel.

The illustrated shovel loader consists of a carriage 1 with endless tracks and provided with a shovel arm 2 mounted to swing up and down on transverse pivots 3 on the carriage by means of a pressure fluid cylinder and piston 4 which is pivotally connected to the carriage by a not illustrated pivot and to the shovel arm 2 by means of a pivot 6. The loader is driven by compressed air which is supplied through a hose 5 but may naturally also be electrically driven or provided with an internal combustion engine or the like. At its free end the shovel arm 2 carries a support 7 which comprises a guide rail rigidly connected to the shovel arm 2 and formed by two channels 8, 9. The support 7 carries a shovel 10 the cross section of which in the longitudinal direction of the loader is substantially of U-shape so that it forms an U-shaped trough extending in the transverse direction of the loader. Said trough is closed at the ends by side walls 11, 12 which are mounted on hinges 13 so that they may be tilted to positions in which they lie substantially flush with the bottom 14 of the shovel. At the underside of the shovel bottom two brackets 15, 16 are provided in which two pairs of rollers 17, 18 are mounted on shafts 19, 20. The roller pairs 17, 18 may move in the channels 8, 9 of the support 7 between two stops 21 and 22 at the ends of the guide channels 8, 9. The shovel 10 is movable sideways selectively towards one of said stops by means of a pressure fluid cylinder 23 the piston rod 24 of which is connected to a slide 25 which with its end portions 26, 27 may selectively press against one or the other of the bearing brackets 15, 16 to move the shovel towards the right or towards the left in FIG. 2.

The pressure fluid cylinder 23 is anchored on a bracket 28 which is welded to the forward portion of the shovel arm 2. A pressure fluid cylinder 29 is pivotally connected to the support 7 and the shovel 10 and serves to tip the shovel selectively towards one side or the other after the shovel has been displaced towards said selected side. Tipping can be carried out when the guide rollers 17 or 18 are disposed just opposite a pair of openings 30 or 31, respectively, in the guide rails 8, 9 in the upper flanges of the guide rails 8, 9. It would be obvious that when the shovel has been displaced towards the right in FIG. 3 so that the pair of rollers 18 is free to pass in and out through the openings 31 then the pair of rollers 17 is locked in the guide rail 8, 9 between the end portion 26 and the stop 21. Pressure fluid for operating the cylinder 23 is supplied and carried away through conduits 32 and 33 controlled by a not illustrated operating valve. Pressure fluid for operating the cylinder 29 is supplied and carried away through conduits 34 and 35 controlled by an operating valve 36 which in the position $a1$ permits the cylinder 29 to contract or expand without obstruction and in the position $a$ causes the cylinder to contract and in the position $b$ causes the cylinder to expand in order to produce tipping. The operating levers for the control valves for the cylinders 4, 23 and 29 are concentrated at a panel at the drivers seat 37 on the carriage 1.

The side walls 11, 12 of the shovel 10 are tiltable on hinge pivots 13 by gravity. The side walls carry cams 38, 39 which cams cooperate with the upper side or flange of the guide channel 9 in such a manner that the side walls 11, 12 are kept closed and locked in raised position when the shovel 10 is in central position, as illustrated in FIG. 2, since in this position both cams 38 and 39 rest on the upper surface of the guide channel 9. When the shovel 10 is displaced a distance, for instance towards the right as illustrated in FIG. 5, then the cam 38 is free of the upper surface of the guide channel 9 and may swing down together with the side wall 11 as illustrated in FIG. 5. When the shovel is displaced completely to the right so that the pair of rollers 17 rests against the stop 21 then the shovel may be dumped by means of the operating cylinder 29 and during the beginning of the upward swinging of the shovel the cam 39 also becomes free to swing down so that the side wall 12 is tilted to the position illustrated in FIG. 4. The pair of rollers 18 may in this position pass through the openings 31 and the shovel may be tipped on the axis 19 of the pair of rollers 17. Abutments 40, 41 on the cams 38, 39 prevent the side walls from being swung past the position illustrated in FIG. 3.

Since it may sometimes be desirable to prevent that a side wall situated at the opposite side of the shovel to the dumping side is opened during tipping a locking bar 42 for the side walls may be provided, for instance as illustrated in FIG. 7. Such a locking bar may comprise a bar 42 which is mounted in slide bearings 43 at the underside of the shovel and is kept in various positions of displacement by friction in friction bushes 44 of rubber or the like which are also secured to the bottom of the shovel 14. The guide channel 9 in this case carries two abutments 45, 56 between which a lug 47 on the locking bar 42 is positioned when the shovel is in digging position. The cams 38, 39 are provided with abutments 48, 49 for the locking bar 42 and obviously the side walls 11 and 12, respectively, are prevented from being tilted by the locking bar 42 when said bar is displaced towards the right or the left, respectively, in FIG. 7. It is also obvious that a displacement of the shovel 10 for instance towards the right in FIG. 7 against the stop 21 results in the locking bar 42 being moved towards the left relative to the shovel 10 so that consequently the side wall 12 is locked since the abutment 49 prevents tilting of the sidewall 12. When the shovel has been displaced it may be tilted and then the side wall 12 remains locked by the locking bar 42 whereas the side wall 11 is free to be tilted. When the shovel 10 is moved back to horizontal position the lug 47 moves in between the abutments 45, 46 and when the shovel by means of the cylinder 23 is returned to central position for continued digging then the locking bar 42 is simultaneously moved to the position illustrated in FIG. 7. The locking bar 42 operates in the same way during tipping of the shovel towards the left in FIGS. 2 and 7, respectively.

The loader above described and the shovel arrangements should only be considered as examples and may be modified in various different ways within the scope of the claims. The illustrated cylinders are preferably operated by hydraulic oil which is delivered from a compressed air driven oil pump on the carriage 1. The invention also covers shovels as described hereinabove and illustrated on the drawings for shovel loaders.

I claim:

1. A shovel loader having a side-tipping shovel consisting of a transverse trough carried by a support and locked against side tipping relatively to the support while in digging position, said trough being movable toward a side of the loader and unlocked for tipping and discharging toward said side, pivotal side walls for closing the opposite ends of the trough, said walls being gravitationally tiltable to open position when the trough is brought to a tilted dumping position, a cam carried by each of the side walls, a fixed element on the support and contacting the cams to swing the side walls to a closed position when the trough is moved to an untilted position and to hold the side walls closed when the trough is untilted, means for moving the trough to bring it to a tilted position and cause the cams to be moved away from the fixed element and permit the side walls to be gravitationally lowered.

2. A shovel loader according to claim 1, wherein the fixed element is a guide rail attached to a shovel arm, the cams on the side walls riding on said rail when the trough is in an untilted position, one of the cams being raised above and being free from contact with the rail, and the other cam being positioned beyond one end of the rail when the trough is located in its inclined dumping position.

3. A shovel loader according to claim 2, wherein the cams on the side walls and riding on the guide rail act to lock the side walls in raised position while the trough is centrally positioned on its support, and the tilting movement of the trough frees the cams from contact with said guide rail.

4. A shovel loader according to claim 1, wherein the cams carry projections forming abutments for contact with a bottom wall of the trough when the trough is tilted and when the end walls are in lowered position, such abutments being effective to position the walls as planar extensions of the bottom of the trough during dumping procedure.

5. A shovel loader according to claim 3, wherein the shovel side walls are selectively tiltable, a locking bar being provided for slidable movement on the trough, means for holding said locking bar against sliding movement while the trough is in an untilted position, means for moving the trough relatively to the locking bar upon movement of the trough toward one side whereby said locking bar will lock the side wall at the opposite side against tilting.

6. A shovel loader having a side-tipping shovel mounted on said loader for movement from a low digging position to a raised side tipping position, said shovel being in the form of a trough that extends transversely of the loader, a movable support on the loader for mounting the trough, means on said support for locking the shovel against side tipping, and relatively to the support when the shovel is in a digging position, means on the support for unlocking the shovel relatively to the support to permit side tipping upon movement of the shovel on the support towards the dumping side, side walls at the opposite lateral ends of the shovel for normally closing said ends, the side wall at said dumping side being tiltable and unlocked for tilting by side movement of the shovel towards the dumping side, means normally acting to hold the side wall on the dumping side in closed position while the shovel is in an untilted position, such means being carried by the shovel and being movable with the shovel to locate such means beyond the support when the shovel is moved toward dumping position and thereby cause opening of one of the side walls so that said side wall upon following tipping of the shovel to the dumping side is tilted to a position which permits a substantially unrestricted flow of material from the shovel towards the dumping side.

References Cited

UNITED STATES PATENTS

| | | | |
|---|---|---|---|
| 2,821,313 | 1/1958 | Warner | 214—768 |
| 3,313,437 | 4/1967 | Eriksson | 214—768 |
| 3,402,841 | 9/1968 | Salna et al. | 214—768 |

HUGO O. SCHULZ, Primary Examiner